(No Model.)

G. C. WARD.
GALVANIC BATTERY.

No. 409,259. Patented Aug. 20, 1889.

Witnesses
H. C. Young.
Jno. R. Snow.

Inventor
Geo. C. Ward
by his attorney

UNITED STATES PATENT OFFICE.

GEORGE CALVIN WARD, OF BOSTON, MASSACHUSETTS, ASSIGNOR TO THE ADVANCE ELECTRIC COMPANY, OF SACO, MAINE.

GALVANIC BATTERY.

SPECIFICATION forming part of Letters Patent No. 409,259, dated August 20, 1889.

Application filed November 19, 1888. Serial No. 291,223. (No model.)

*To all whom it may concern:*

Be it known that I, GEORGE CALVIN WARD, of Boston, in the county of Suffolk and State of Massachusetts, have invented a new and useful Improvement in Voltaic Batteries, of which the following is a specification, reference being to the accompanying drawings, in which—

Figure 1:
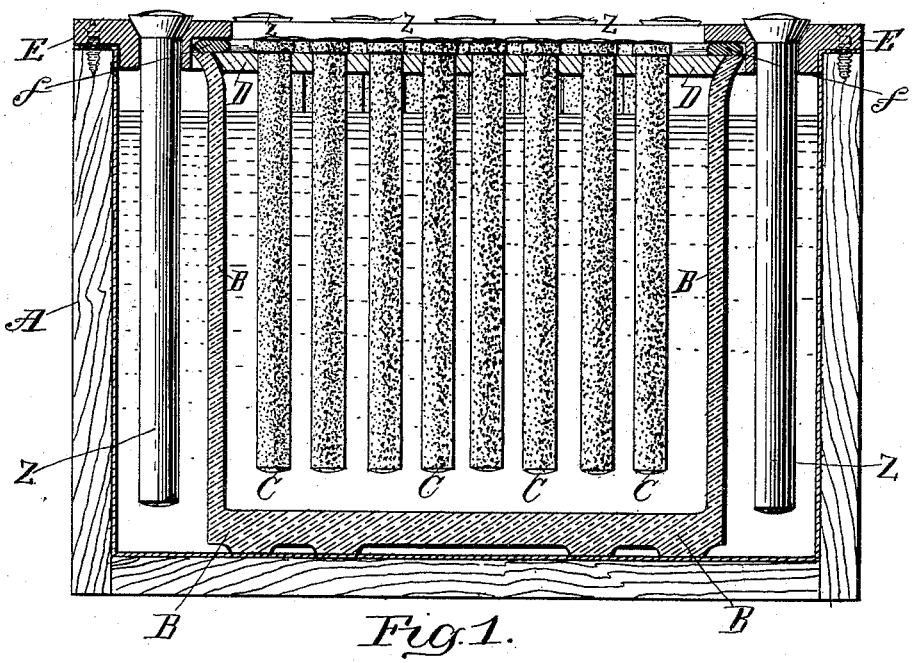
Figure 2:
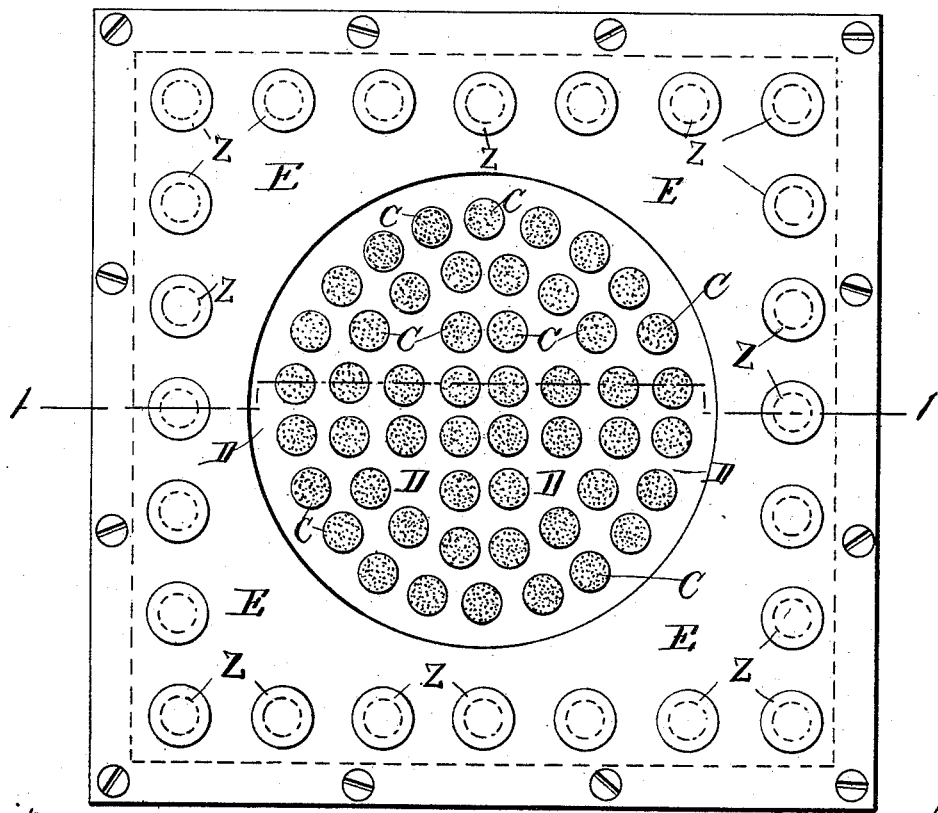

Figure 1 is a transverse section of a battery on line 1 1 of Fig. 2. Fig. 2 is a plan of my new battery.

My invention is an improved galvanic battery in which a zinc element is in a solution of caustic soda, or, more strictly speaking, sodium hydrate, and in which the carbon element is in a bath composed of trioxide of chromium, an alkaline chloride, nitric acid, and water, that bath being contained in a porous cell, the porous cell being in the solution which contains the zinc element; and my invention is based upon the discovery that the action of the battery is greatly improved by the use of these two baths thus arranged.

In the best form of my battery (that shown in the drawings) the main cell contains a solution of caustic soda about 40° Baumé, and rods of zinc are suspended in that solution, while the porous cell contains a solution of trioxide of chromium, chloride of sodium, and nitric acid in water in the proportions substantially as stated below. I have found that the use of these solutions or baths greatly improves the action of the battery, giving an electro-motive force over fifty per cent. greater than that of common cells—such as the Grove, the Bunsen, and the bichromate—and there being a vast difference in the output and in constancy, and the main feature of my invention is the use of these two baths with the zinc and carbon elements.

In practice I use a wooden containing cell A, lined with tin-plate, and a porous cell B in the middle of the containing cell. Where my batteries are to be used upon railroad-trains it is important to have a cover E over the space between the exterior of the porous cell and the interior of the containing cell, and also a cover D over the porous cell, so as to prevent the escape of liquids, and these covers also afford convenient supports for the zincs and carbons.

In the drawings the carbons C are supported by the cover D, which is perforated for that purpose, the carbons shown being such as are used in arc lights. The zincs Z are rods which are supported by the cover E. A packing-ring $f$ is desirable between the flange of the main cover E and the cover D, as shown in the drawings. The space between the porous cell B and the containing cell A is filled with caustic-soda solution to the level of the dotted line and the porous cell is filled with a liquid which is composed of brine made by dissolving about one pound of common salt (chloride of sodium or any like alkaline chloride—for example, either of the alkaline chlorides $NaCl$, $KCl$, $NH_4Cl$, $CaCl_2$, $BaCl_2$, $SrCl_2$ might be used; but for cheapness $NaCl$ is preferable) and one and a half pound of trioxide of chromium in a gallon of water, about one-half gallon of nitric acid being added to the solution. I use the commercial nitric acid 36° Baumé.

The chemical reactions will be clear without description here; nor do I think it necessary to explain my theory of the beneficial action of the alkaline chloride.

I have obtained from my battery an electro-motive force at the start as high as three and five-tenths volts and an internal resistance of .1 of an ohm with a constant action for many consecutive hours with an electro-motive force as high as two and eight-tenths volts, and a practical efficiency which I believe to be greater than that obtained by any other battery.

I am aware of the patents to Wilson, No. 216,774, dated June 24, 1879, and Partz, No. 353,757, dated December 7, 1886, both of which show an outer containing vessel, an inner porous cup and two covers, one for the outer vessel and the other for the inner cup not substantially different from the like parts in my battery, except that the covers have each but one perforation, while in my battery the covers have each many perforations. The Wilson and Partz batteries are also wholly unlike mine in construction, in that the elements in my battery each consists of many rods. While I do not assert that I am the first to construct a battery with an outer vessel, an inner cup, and two covers, nor the first to use elements each of which is composed of many rods, yet I do assert that I am the first to combine these features, and that this combination is of great practical utility as well as wholly new with me.

What I claim as my invention is—

1. The improved battery above described, consisting of a zinc element in a solution of sodium hydrate and a carbon element in a porous cell containing a bath composed of trioxide of chromium, an alkaline chloride, nitric acid, and water, substantially as set forth.

2. In combination, the outer cell A, its cover E, the series of rods Z, arranged in cell A and projecting through cover E, substantially as shown, inner cell B, its cover D, and the series of rods C, arranged in cell B and projecting through cover D, substantially as shown, each cover sustaining its series of rods, and all the elements being combined substantially as set forth.

GEORGE CALVIN WARD.

Witnesses:
EDWARD S. BEACH,
JOHN R. SNOW.